Patented July 22, 1952

2,604,465

UNITED STATES PATENT OFFICE 2,604,465

SELECTIVE COPOLYMERIZATION OF ISOBUTYLENE FROM A C₄ MIXTURE

Helmuth G. Schneider, Westfield, David W. Young, Roselle, and Hans G. Goering, Elizabeth, N. J., assignors to Standard Oil Development Company, a corporation of Delaware No Drawing. Application May 20, 1950,
Serial No. 163,326

9 Claims. (Cl. 260—80.7)

This invention relates to the copolymerization of isobutylene with a polymerizable compound containing an aromatic nucleus and more particularly relates to the copolymerization of an impure isobutylene with styrene.

It is known that isobutylene can be copolymerized with styrene at temperatures not above 0° C. in the presence of an active halide polymerization catalyst. This process is well described in U. S. Patent No. 2,274,749. The process described in this patent presupposes the use of pure monomers since it is well known in the art that the presence of other olefins substantially reduces the molecular weight of the product by virtue of catalyst poisoning. Substantial amounts of isobutylene are formed by the cracking of hydrocarbon mixtures and is obtained in admixture with other four carbon hydrocarbons in a preliminary distillation of the cracked products. The following is an analysis of a typical C₄ cut:

| | Per cent by volume |
|---|---|
| Propylene | 0.1 |
| Propane | 1.6 |
| Isobutane | 35.2 |
| n-Butane | 18.3 |
| Isobutylene | 15.9 |
| Butene-1 | 12.2 |
| Trans butene-2 | 9.2 |
| Cis butene-2 | 6.2 |
| Butadiene | 0.3 |
| C₅+ | 0.6 |
| Total C₄ olefins | 43.5 |
| Total sec. olefins | 27.6 |

It has been the usual custom to remove the isobutylene from this fraction by distillation, acid treatment or other means designed to obtain a practically 100% pure isobutylene or one containing no secondary olefin. This is often an expensive and time-consuming process.

The present process overcomes these disadvantages of the prior art by providing an improved process for carrying out the copolymerization.

According to the present invention, the isobutylene contained in any C₄ cut obtained in the cracking of hydrocarbons is selectively copolymerized with styrene or other polymerizable organic compound containing an aromatic nucleus by subjecting the mixture of the C₄ cut and the polymerizable compound to the action of a controlled amount of metal halide only slightly in excess of that needed to initiate the reaction. Either solid catalyst or catalyst dissolved in a non-polar solvent may be used at polymerization temperatures not above +10° C., but as low as −20° C., −40° C., −80° C. or even lower. The solvent used must be one which forms no complex with the aluminum chloride and which remains a liquid at the reaction temperature. Suitable solvents are the lower alkyl halides such as methyl chloride and ethyl chloride. Suitable metal halides include aluminum halides such as aluminum chloride or aluminum bromide, titanium chloride, zirconium tetrachloride.

The invention will be more clearly understood from the following examples.

EXAMPLE 1

Two liters of a refinery C₄ cut containing 181 gms. of isobutylene and 496 gms. total olefins were reacted at −35° C. with 261 gms. of styrene in two batches. The first batch was polymerized with solid aluminum chloride whereas aluminum chloride dissolved in ethyl chloride was used for the second. The data are presented in the following tables. Table I shows that a higher yield of resin and catalyst efficiency were obtained with the liquid catalyst at this temperature (−35° C.). Table II shows that isobutylene is removed selectively from the feed, using either solid or liquid catalyst. The resins formed at this temperature are relatively hard.

Table I

OPERATING CONDITIONS

| Run | Feed, Weight Percent Styrene | | Weight Percent Catalyst (on Styrene + total olefins) | | Reaction | | Weight Percent Polymer Yield | | Catalyst Efficiency |
|---|---|---|---|---|---|---|---|---|---|
| | (on Styrene + Isobutylene basis) | (on Styrene + total olefins basis) | Solid | Liquid | Time (min.) | Temp. (°C.) | (on Styrene + Isobutylene) | (on Styrene + total olefins) | (gms. polymer/ gm. AlCl₃) |
| 1 | 59 | 34 | 4.9 | | 120 | −35 | 6.8 | 4.0 | |
| 2 | 59 | 34 | | 0.66 | 81 | −35 | 107.0 | 62.0 | 89 |

Table I—Continued

PRODUCT EVALUATION (STEAM STRIPPED AT 200° C.)

| Run # | Weight Percent Crude Polymer Yield | | (Weight Percent on Crude polymer) | | Inspections of Bottoms (Resin) | | |
|---|---|---|---|---|---|---|---|
| | (on Styrene and Isobutylene) | (on Styrene + total olefins) | Distillate | Bottoms (Resin) | Intrinsic Visc. (toluene solvent) | Soft. Point (Ball and Ring) °C. | Penetration at 77° F. |
| 1 | 6.8 | 4.0 | | | | | |
| 2 | 107.0 | 62.0 | 5 | 95 | 0.049 | 61° C. | 1.0 |

Table II

ANALYSIS OF C₄ CUT (LIQUID VOLUME PERCENT)

| Component | Feed | Spent C₄ Cut | |
|---|---|---|---|
| | | Run #1 | Run #2 |
| C₃ | 18.4 | 16.9 | 17.5 |
| Isobutane | 39.9 | 41.6 | 43.3 |
| n-Butane | 14.5 | 12.2 | 0.0 |
| Isobutylene | 12.1 | 11.7 | 12.7 |
| Butene-1 | 5.2 | 6.2 | 10.0 |
| cis butene-2 | 7.7 | 8.5 | 11.6 |
| trans butene-2 | 0.4 | 0.4 | 0.2 |
| Butadiene | | | |
| C₅+ | 1.8 | 2.5 | 4.7 |
| Total | 100.0 | 100.0 | 100.0 |

EXAMPLE 2

Two liters of a refinery C₄ cut containing 148 gms. of isobutylene and 392 gms. of total olefins were reacted under reflux conditions with styrene in three batches using solid aluminum chloride as the catalyst: a different amount of styrene was added to each batch. The temperature was maintained at 0° C. The data are presented in the following tables. Table III shows that high yields of resin and catalyst efficiencies were obtained and Table IV shows that isobutylene is removed selectively from the feed. The resins formed are relatively soft.

Table IV

ANALYSIS OF C₄ CUT (LIQUID VOLUME PERCENT)

| Component | Feed | Spent C₄ Cut | | |
|---|---|---|---|---|
| | | Run #3 | Run #4 | Run #5 |
| C₃ | 0.0 | 0.6 | 0.4 | 0.0 |
| Isobutane | 18.7 | 22.6 | 22.0 | 20.5 |
| n-butane | 46.7 | 55.3 | 55.7 | 55.3 |
| Isobutylene | 11.9 | 0.2 | 0.7 | 2.6 |
| Butene-1 | 9.2 | 10.1 | 10.1 | 10.3 |
| cis butene-2 | 3.8 | 3.8 | 3.9 | 3.9 |
| trans butene-2 | 5.8 | 6.4 | 6.1 | 6.3 |
| Butadiene | 0.4 | 0.2 | 0.1 | 0.2 |
| C₅+ | 3.5 | 0.8 | 1.0 | 0.9 |

EXAMPLE 3

Three additional runs were made under the same conditions as in Example 2 except that the catalyst was aluminum chloride dissolved in ethyl chloride. When but 0.13% AlCl₃ was used (run #6), only a small amount of resin was formed, as shown by Table V. However, Table VI shows that only isobutylene was removed from the feed to copolymerize with the styrene. When as much as 0.70 and 0.76% AlCl₃ dissolved in ethyl chloride was used, all the olefins were copolymerized with the styrene, as shown in Table V.

Table III

OPERATING CONDITIONS

| Run # | Feed, Weight Per Cent Styrene | | Weight Per Cent Catalyst (on Styrene + Total Olefins) Solid AlCl₃ | Reaction | | Weight Per Cent Polymer Yield | | Catalyst Efficiency (gms. polymer/ gm. AlCl₃) |
|---|---|---|---|---|---|---|---|---|
| | (on Styrene + Isobutylene basis) | (on Styrene + total olefins basis) | | Time (min.) | Temp. (0° C.) | (on Styrene + Isobutylene) | (on Styrene + Total Olefins) | |
| 3 | 40 | 20 | 0.41 | 120 | 0 | 115 | 58 | 142 |
| 4 | 50 | 27 | 0.37 | 120 | 0 | 110 | 60 | 162 |
| 5 | 60 | 36 | 0.33 | 120 | 0 | 97 | 59 | 180 |

PRODUCT EVALUATION (STEAM STRIPPED AT 200° C.)

| Run # | Weight Per Cent Crude Polymer Yield | | (Weight Per Cent on Crude Polymer) | | Inspection of Bottoms (Resin) | | |
|---|---|---|---|---|---|---|---|
| | (on Styrene + Isobutylene) | (on Styrene + Total Olefins) | Distillate | Bottoms (Resin) | Intrinsic Visc. (toluene solvent) | Soft. Pt. (Ball and Ring) °C. | Penetration at 77° C. |
| 3 | 115 | 58 | 3 | 97 | 0.042 | 28 | too soft |
| 4 | 110 | 60 | 3 | 97 | 0.043 | 40 | 18.5 |
| 5 | 97 | 59 | 4 | 96 | 0.038 | 57 | 10.3 |

Table V
OPERATING CONDITIONS

| Run # | Feed, Weight Percent Styrene | | Weight Percent Catalyst (on Styrene+Total Olefins Liquid) | Reaction | | Weight Percent Polymer Yield | | Catalyst Efficiency (gms. Polymer/gm. AlCl₃) |
|---|---|---|---|---|---|---|---|---|
| | (On Styrene+ Isobutylene Basis) | (On Styrene+ Total Olefins basis) | | Time (min.) | Temp. (°C.) | (On Styrene+ Isobutylene) | (On Styrene+ Total Olefins) | |
| 6 | 59 | 34 | 0.13 | 60 | +1 | 6.8 | 4.0 | 30 |
| 7 | 79 | 57 | 0.70 | 60 | +3 | 132.6 | 95.0 | 136 |
| 8 | 86 | 69 | 0.76 | 90 | +3 | 123.0 | 99.0 | 130 |

PRODUCT EVALUATION (STEAM STRIPPED AT 200°C.)

| Run # | Visual Inspection |
|---|---|
| 6 | Yield too low. |
| 7 | Soft, tacky product. |
| 8 | Fairly brittle, but tacky product. |

Table VI
ANAYLSIS OF C₄ CUT (LIQUID VOLUME PERCENT)

| Component | Feed | Spent C₄ Cut, Run #6 |
|---|---|---|
| C₃ | | |
| Isobutane | 18.4 | 15.6 |
| n-butane | 39.9 | 37.5 |
| Isobutylene | 14.5 | 13.4 |
| Butene-1 | 12.1 | 12.4 |
| cis butene-2 | 5.2 | 7.8 |
| trans butene-2 | 7.7 | 9.8 |
| Butadiene | 0.4 | 0.3 |
| C₅+ | 1.8 | 3.2 |

From the above data, it is evident that isobutylene selectively polymerizes from a mixture with other olefins when carrying out the reaction in the presence of solid aluminum chloride. When using AlCl₃ dissolved in a non-polar solvent, the amount of catalyst added to the C₄ cut-styrene reaction mixture must be closely controlled in order to obtain selectively copolymerization of styrene and isobutylene. If larger amounts of liquid catalyst are used, all of the olefins in the C₄ cut tend to polymerize with the styrene.

The nature of the present invention having thus been set forth what is claimed as new and useful and desired to be secured by Letters Patent is:

1. The process of selectively copolymerizing isobutylene from its mixture with other C₄ olefins, said mixture containing not more than 0.4% of butadiene, which comprises adding styrene to said mixture of isobutylene and C₄ olefins and subjecting the mixture of styrene, isobutylene and other olefins to copolymerization at temperatures not above +10° C. in the presence of an amount of aluminum chloride only slightly in excess of that needed to initiate the reaction.

2. Process according to claim 1 in which the reaction is carried out in the presence of solid aluminum chloride.

3. Process according to claim 1 in which the reaction is carried out in the presence of aluminum chloride dissolved in a non-complex forming non-freezing alkyl halide solvent.

4. The process which comprises subjecting a mixture of styrene, isobutylene, butene-1, cis butene-2, trans butene-2, and butadiene, the amount of butadiene being not more than 0.4% of the materials other than styrene, to temperatures not above +10° C. in the presence of an amount of aluminum chloride only slightly in excess of that required to initiate the reaction whereby the isobutylene is copolymerized with the styrene to the substantial exclusion of the butene-1, butene-2, and butadiene.

5. Process according to claim 4 in which the reaction is carried out in the presence of solid aluminum chloride.

6. Process according to claim 4 in which the reaction is carried out in the presence of aluminum chloride dissolved in a non-complex forming non-freezing alkyl halide solvent.

7. The process of making a resin composed essentially of styrene and isobutylene, which comprises adding styrene to a petroleum C₄ fraction containing about 11.9 to 15.9% of isobutylene, about 18.8 to 27.6% of other butenes, not more than about 0.1% propylene, not more than about 0.4% of butadiene, and not more than about 3.5% of C₅ hydrocarbons, the balance being butanes, the amount of styrene in said mixture being about 40 to 86% on the basis of the total amount of styrene plus isobutylene, and subjecting the mixture of styrene and C₄ fraction to copolymerization at a temperature of −80° C. to 10° C., in the presence of an amount of aluminum chloride only slightly in excess of that needed to initiate the reaction, the amount of said catalyst being sufficient to cause substantially complete copolymerization of the styrene with the isobutylene, but insufficient to cause more than a minor proportion of the other butenes to enter into the copolymerization.

8. Process according to claim 7 using as catalyst aluminum chloride dissolved in an alkyl chloride of 1 to 2 carbon atoms, the amount of said aluminum chloride being about 0.66 to 0.76% based on the styrene plus total olefins.

9. Process according to claim 8 carried out at a polymerization temperature of −35° C. to 3° C.

HELMUTH G. SCHNEIDER.
DAVID W. YOUNG.
HANS G. GOERING.

REFERENCES CITED

The following references are of record in the file of this patent:

UNITED STATES PATENTS

| Number | Name | Date |
|---|---|---|
| 2,438,340 | Johnson | Mar. 23, 1948 |